United States Patent [19]

Hoefer et al.

[11] Patent Number: 5,296,576
[45] Date of Patent: Mar. 22, 1994

[54] FATTY OIL EX HELIANTHUS ANNUUS FOR THE PRODUCTION OF EMULSIFIERS FOR EMULSION POLYMERIZATION

[75] Inventors: Rainer Hoefer, Duesseldorf; Horst Eierdanz, Hilden, both of Fed. Rep. of Germany

[73] Assignee: Henkel Kommanditgesellschaft auf Aktien, Duesseldorf, Fed. Rep. of Germany

[21] Appl. No.: 955,393

[22] Filed: Oct. 1, 1992

Related U.S. Application Data

[63] Continuation of Ser. No. 190,792, May 6, 1999, abandoned.

[30] Foreign Application Priority Data

May 8, 1987 [DE] Fed. Rep. of Germany ....... 3715421

[51] Int. Cl.$^5$ ................................ C08K 5/09
[52] U.S. Cl. .................... 526/216; 526/210; 526/204; 524/724; 524/728
[58] Field of Search .......... 526/216, 204, 218; 524/87, 778, 724

[56] References Cited

U.S. PATENT DOCUMENTS

| | | | |
|---|---|---|---|
| 2,418,782 | 4/1947 | Mark et al. | 260/86.5 |
| 2,469,132 | 5/1949 | Schulze et al. | 260/79 |
| 2,589,919 | 3/1952 | Arundale et al. | 260/82.3 |
| 2,623,032 | 12/1952 | Banes et al. | 260/45.5 |
| 2,981,222 | 4/1961 | Enk et al. | 526/210 |
| 3,031,480 | 6/1959 | Piekarski et al. | |
| 3,269,968 | 8/1966 | Hannah, Jr. | 260/23.7 |
| 4,169,928 | 10/1979 | Sidi | 526/344.2 |
| 4,536,568 | 8/1985 | Wunder | 528/487 |
| 4,627,192 | 12/1986 | Fick et al. | 47/58 |
| 4,686,255 | 8/1987 | Erwied et al. | 524/104 |

FOREIGN PATENT DOCUMENTS

| | | |
|---|---|---|
| 434794 | 10/1916 | Fed. Rep. of Germany . |
| 706548 | 5/1941 | Fed. Rep. of Germany . |
| 923333 | 2/1955 | Fed. Rep. of Germany . |
| 2638544 | 6/1977 | Fed. Rep. of Germany . |
| 2510803 | 6/1987 | Fed. Rep. of Germany . |
| WO8501053 | 3/1985 | PCT Int'l Appl. . |
| 744455 | 2/1956 | United Kingdom . |

OTHER PUBLICATIONS

R. R. Dunbrook, India Rubber Wold. 117, 203 (1948) to follow.
H. Bartl, Houben-Weyl, Methoden der organischen Chemie, vol. XIV/1, Makromolekulare Stoffe, Part 1, p. 193, Georg-Thieme-Verlag, Stuttgart (1961) to follow.
M. H. Reich, B. Moss, J. M. Gyenge, Rubber Age (N.Y.), 76, p. 391 (1954) to follow.
C. W. Carr, I. M. Kolthoff, E. J. Meehan, R. J. Stenberg, J. Polymer Sci. 5, 191 (1950).
J. W. Wilson, E. S. Pfau, Ind. Eng. Chem. 40, 530 (1948).
W. Graulich, W. Becker Makromol. Chem. 3, 70 (1949) to follow.
cf. H. Schoenfeld (Ed.), Chemie und Technologie der Fette und Fettprodukte, vol. 2, p. 534 et seq. Verlag Julius Springer, Vienna 1937).

*Primary Examiner*—Joseph L. Schofer
*Assistant Examiner*—Jeffrey T. Smith
*Attorney, Agent, or Firm*—Ernest G. Szole; Wayne C. Jaeschke; Henry E. Millson, Jr.

[57] ABSTRACT

The use of fatty oil ex Helianthus annuus containing 78 to 92% by weight oleic acid and 2 to 10% by weight linoleic acid for the production of alkali metal, ammonium and/or alkanolammonium salts of optionally dihydroxy-substituted fatty acids as emulsifiers for emulsion polymerization. Excellent polymerization results are obtained despite the high linoleic acid content.

16 Claims, No Drawings

FATTY OIL EX *HELIANTHUS ANNUUS* FOR THE PRODUCTION OF EMULSIFIERS FOR EMULSION POLYMERIZATION

This application is a continuation of application Ser. No. 07/190,792 filed on May 6, 1988 now abandoned.

BACKGROUND OF THE INVENTION

1. Field of the Invention

This invention relates to the use of a fatty oil ex *Helianthus annuus* for the preparation of emulsifiers for emulsion polymerization.

2. Statement of Related Art

It is known that alkali metal salts of fatty acids are particularly suitable for the emulsion polymerization of monomers, such as butadiene, styrene, chloroprene or acrylonitrile; cf. R. R. Dunbrook, India Rubber Wld. 117, 203 (1948). Stable latices are formed and may readily be coagulated by acidification or with a saturated sodium chloride solution. It has been shown that, compared with one another, the salts of $C_{16}$–$C_{18}$ fatty acids used as emulsifiers in the copolymerization of butadiene give the same polymerization velocities of the monomers (H. Bartl, Houben-Weyl, Methoden der organischen Chemie, Vol. XIV/1, Makromolekulare Stoffe, Part 1, page 193, Georg-Thieme-Verlag, Stuttgart (1961). Unsaturated fatty acids are distinguished from saturated fatty acids having the same number of carbon atoms by their liquid consistency and by the better solubility of their alkali metal salts. This provides for better handling in practice. For example, sodium oleate has already played a significant role in the development of the emulsion polymerization of synthetic rubber. It is an effective emulsifier, even at low temperatures (M. H. Reich, B. Moss, J. M. Gyenge, Rubber Age (N.Y.) 76, page 391 (1954)). In addition, sodium and potassium oleate as polymerization emulsifiers are described in U.S. Pat. No. 2,469,132; U.S. Pat. No. 2,589,919; U.S. Pat. No. 2,418,782; German Patent 923,333; GB 744,455; and U.S. Pat. No. 2,623,032.

Although oleates are thus well known as polymerization emulsifiers, it has been found that polymerization is affected where the soaps contain relatively large proportions of polyunsaturated fatty acids. This is normally the case where the soaps are obtained from fats of natural origin, cf. C. W. Carr, I. M. Kolthoff, E. J. Meehan, R. J. Stenberg, J. Polymer Sci. 5, 191 (1950) and J. W. Wilson, E. S. Pfau, Ind. Eng. Chem. 40, 530 (1948). The polymerization reaction is inhibited particularly severely by sodium linoleate (J. W. Wilson, E. S. Pfau, loc. cit.). Sodium oleate has already been used as a regulator in the synthesis of rubber (H. Bartl, loc. cit., page 194; Germany Patent 706,548; and W. Graulich, W. Becker, Makromol. Chem. 3, 70 (1949)).

Accordingly, there has been no shortage of attempts to produce oleic acids of low linolenic and linoleic acid content which are suitable for polymerization purposes. Although it is possible relatively easily to convert tallow fatty acid into a fatty acid composition eminently suitable for the production of synthetic rubber by selective catalytic hydrogenation, the advantage of oleic acid in terms of handling, namely its liquid consistency, is lost in this hardening process.

In practice, liquid and solid fatty acids can be separated by
 hydraulic pressing,
 solvent separation, or
 rolling-up by the Twitchell process (cf. H. Schoenfeld
 (Ed.), Chemie und Technologie der Fette und Fettprodukte, Vol., 2, pages 534 et seq, Verlag Julius Springer, Vienna, 1937).

Although it should be possible to separate polyunsaturated fatty acids from oleic acid by extraction processes, the sulfur dioxide proposed as extractant for this purpose can only be handled with considerable safety precautions, cf. German patent 434,794. Modern processes for the recovery of oleic acid are based either on the separation of solid and liquid fatty acids by hydrophilization or by solvent extraction. It is only olive oil fatty acid that can be directly obtained without separation steps from the splitting of olive oil, but unfortunately the product composition of this fatty acid is highly variable. Normally, olive oil fatty acid still contains about 10 to 15% saturated fatty acids which adversely affect the particle size of the latex. Accordingly, olive oil is not normally suitable as an emulsifier for emulsion polymerization. In addition, fatty acids of high oleic acid content are available from the hoofs of slaughtered cattle (neat's-foot oil, 79% oleic acid), although in this case, too, separation with wetting agents or an extraction process is normally carried out to free the oleic acid from around 20% saturated fatty acids. Finally, tall oil has been used as a raw material for emulsifiers for emulsion polymerization. However, the abietic acid content of tall oil makes a catalytic hardening process (disproportionation) absolutely essential, cf. German patent 2,510,803.

DESCRIPTION OF THE INVENTION

Other than in the operating examples, or where otherwise indicated, all numbers expressing quantities of ingredients or reaction conditions used herein are to be understood as modified in all instances by the term "about".

The present invention is based on the surprising observation that a fatty oil ex Helianthus annuus (sunflower) of a species known, for example, from U.S. Pat. No. 4,627,192, which is expressly incorporated herein by reference, which has an oleic acid content of 78 to 92% by weight, more especially 84 to 90% by weight, and a linoleic acid content of 2 to 10% by weight and more especially 6 to 8% by weight, is eminently suitable despite its high linoleic acid content for the production of alkali metal, ammonium and/or alkanolammonium salts of optionally dihydroxy-substituted fatty acids as emulsifiers for emulsion polymerization without any need for enrichment processes, such as pressing, extraction or wetting agent separation processes. The sunflower species and lines from which the fatty oils used herein are derived include SIGCO 41A, SIGCO 41B, SIGCO 4117B, SIGCO 416R, SIGCO 853R, SIGCO 273W, and sunflower lines based on the foregoing.

Since the fatty oils used as starting materials are natural substances, the proportions of their principal components are subjected to certain variations. The fatty oils typically show the following ranges of variation with respect to the fatty acids:

| | |
|---|---|
| oleic acid: | 78 to 92% by weight |
| linoleic acid: | 2 to 10% by weight |
| palmitic acid: | 2 to 5% by weight |

| | |
|---|---|
| stearic acid: | 2 to 7% by weight, and | up to 1% by weight of one or more of the following acids: myristic, palmitoleic, linolenic, arachic, eicosenoic, and erucic acid.

The fatty acids can be directly obtained by splitting, for example pressure splitting, of the fatty oil, for which purpose simple distillation is sufficient. The fatty acids thus obtained are then directly converted into the alkali metal, ammonium, or alkanolammonium (e.g. mono-, di-, or triethanolammonium) salts, more especially sodium and potassium salts. These salts are particularly suitable for the production of synthetic rubber and emulsion polystyrene, provide for interference-free polymerization behavior and lead to rubber materials of particularly high color quality. These oleic acids may also be converted by epoxidation and hydrolysis of the epoxide bond with water into so-called dihydrostearic acids which in turn are eminently suitable as emulsifiers for the production of polyvinyl chloride by emulsion and microsuspension polymerization processes.

The splitting of the fatty oil can be carried out as follows: the fatty oil is reacted with water at a temperature in the range of 150° to 250° C., preferably about 185° to 215° C., under a pressure of from 15 to 50 bar, preferably 20 to 35 bar. After 5 or 6 hours the glycerol/water phase is separated and the above procedure preferably repeated twice to improve the yield. After the last separation of the glycerol/water phase, the resulting fatty acid mixture is distilled under reduced pressure.

The conversion of the oleic fatty acid mixture into dihydrostearic acid can be carried out as follows. The fatty acid mixture is mixed with acetic acid and sulfuric acid, and the resulting mixture heated to a temperature in the range of from 50° to 90° C., preferably from 60° to 80° C., and treated with hydrogen peroxide to form 9,10-dihydroxystearic acid. The 9,10-dihydroxystearic acid is then directly converted into an alkali metal, ammonium or alkanolammonium salt thereof.

The invention is illustrated but not limited by the following Example in which the emulsifiers prepared in accordance with the invention using fatty acids of the invention are compared with those obtained from a split tallow fatty acid in accordance with the prior art.

EXAMPLE 5 kg. of fatty oil obtained from a *Helianthus annuus* species covered by U.S. Pat. No. 4,627,192 was split in the presence of 0.6 kg water at 200° C./20–35 bar in 5–6 hours. After separation of the glycerol/water phase the fat splitting step was repeated twice. After final removal of water and glycerol the fatty acid mixture was distilled at 160°–190° C./0.2–0.3 bar.

The sunflower oil fatty acid prepared above had the following composition, as determined by gas chromatography:

| | |
|---|---|
| myristic acid: | 0.1% by weight |
| palmitic acid: | 3.1% by weight |
| stearic acid: | 2.0% by weight |
| oleic acid: | 86.2% by weight |
| linoleic acid: | 7.8% by weight |
| linolenic acid: | 0.2% by weight |
| arachic acid: | 0.3% by weight |
| eicosenoic acid: | 0.2% by weight |

| | |
|---|---|
| erucic acid: | 0.2% by weight |

69.6 g of a 2% $K_2S_2O_8$ solution in fully deionized water, 826.0 g fully deionized water, 6.9 g (AS) emulsifier soap (sodium salt) and 297.5 g styrene were introduced together into a 2-liter glass polymerization reactor. The reactor was purged with nitrogen. The reaction mixture was heated with stirring to 75° C. and polymerized for 7 hours. The reaction mixture was then cooled to room temperature and filtered. The results are shown in the following Table:

TABLE

| Emulsifier | Coagulate (%) | Viscosity of the latex | Average latex particle size |
|---|---|---|---|
| I | <0.1 | 15 mPa · s | 43 |
| II | 2.0 | 12.5 mPa · s | n.d. |
| III | 0.4 | 10 mPa · s | 50 |
| IV | 3.5 | 10 mPa · s | n.d. |

Emulsifier soaps (Na salts) tested:
I Sunflower oil fatty acid according to the invention
II Technical 9,10-dihydroxystearic acid based on a sunflower oil fatty acid according to the invention
Comparison
III Technical oleic acid (split tallow fatty acid)
IV Technical 9,10-dihydroxystearic acid based on split tallow fatty acid The Table shows that favorable results with respect to coagulate formation are obtained with the emulsifier soaps according to the invention, although these emulsifiers have a linoleic acid content of the same high order as emulsifiers obtained from split tallow fatty acid in accordance with the prior art.

The 9,10-dihydroxystearic acid from the sunflower oil fatty acid of the invention and the 9,10-dihydroxystearic acid from split tallow fatty acid were prepared as follows:

With stirring 250 g of sunflower oil fatty acid mixture or split tallow fatty acid were dissolved in 30 g glacial acetic acid and subsequently mixed with 7 g aqueous $H_2SO_4$ (50% by weight). The mixture obtained was heated at 70° C. and with good stirring 86.4 g $H_2O_2$ (50% by weight) were added drop by drop. After the addition of $H_2O_2$ was completed the reaction mixture was stirred at 73°–75° C. for 2.5 hours. The reaction mixture was then washed with distilled water at 65° C. 9,10-dihydroxystearic acid based on sunflower oil fatty acid:

| | |
|---|---|
| iodine number: | 4.5 |
| acid number: | 166.2 |
| saponification number: | 202.5 |
| OH number: | 201.9 |

9,10-dihydroxystearic acid based on split tallow fatty acid:

| | |
|---|---|
| iodine number: | 4 |
| acid number: | 165.7 |
| saponification number: | 203 |
| OH number: | 202 |

We claim:

1. In a emulsion polymerization process, the improvement wherein the emulsifier comprises an emulsifying effective quantity of at least one salt of a fatty acid mixture wherein said salt is selected from the group consisting of alkali metal, ammonium, and alkanolammonium salts, and wherein the fatty acid mixture is obtained from a fatty oil ex *Helianthus annuus* wherein the fatty acid mixture comprises the following components:

| | |
|---|---|
| oleic acid: | 78 to 92% by weight |
| linoleic acid: | 2 to 10% by weight |
| palmitic acid: | 2 to 5% by weight |
| stearic acid: | 2 to 7% by weight, and |
| up to 1% by weight of one or more of the following acids: myristic, palmitoleic, linoleic, arachic, eicosenoic, and erucic acid. | |

2. The process of claim 1 wherein the *Helianthus annuus* is one or more of the following lines: SIGCO 41A, SIGCO 41B, SIGCO 4117B, SIGCO 416R, SIGCO 853R, SIGCO 273W, and lines based on the foregoing.

3. The process of claim 1 wherein the fatty oil contains from about 6 to about 8% linoleic acid.

4. The process of claim 1 wherein the salt of a fatty acid mixture is a salt of a fatty acid mixture in which the oleic acid content thereof has been converted to 9,10-dihydroxystearic acid.

5. The process of claim 1 wherein the emulsion polymerization process is the emulsion polymerization of synthetic rubber, polystyrene, or polyvinyl chloride.

6. The process of claim 4 wherein the emulsion polymerization process is the emulsion polymerization of synthetic rubber, polystyrene, or polyvinyl chloride.

7. An emulsion polymerization reaction mixture which contains an emulsifying effective quantity of at least one salt of a fatty acid mixture wherein said salt is selected from the group consisting of alkali metal, ammonium, and alkanolammonium salts, and wherein the fatty acid mixture is obtained from a fatty oil ex *Helianthus annuus* wherein the fatty acid mixture comprises the following components:

| | |
|---|---|
| oleic acid: | 78 to 92% by weight |
| linoleic acid: | 2 to 10% by weight |
| palmitic acid: | 2 to 5% by weight |
| stearic acid: | 2 to 7% by weight, and | up to 1% by weight of one or more of the following acids: myristic, palmitoleic, linoleic, arachic, eicosenoic, and erucic acid.

8. The reaction mixture of claim 7 wherein the *Helianthus annuus* is one or more of the following lines: SIGCO 41A, SIGCO 41B, SIGCO 4117B, SIGCO 416R, SIGCO 853R, SIGCO 273W, and lines based on the foregoing.

9. The reaction mixture of claim 7 wherein the fatty oil contains from about 6 to about 8% linoleic acid.

10. The reaction mixture of claim 7 wherein the salt of a fatty acid mixture is a salt of a fatty acid mixture in which the oleic acid content thereof has been converted to 9,10-dihydroxystearic acid.

11. The reaction mixture of claim 7 wherein the emulsion polymerization reaction mixture is of synthetic rubber, polystyrene, or polyvinyl chloride.

12. The reaction mixture of claim 10 wherein the emulsion polymerization reaction mixture is of synthetic rubber, polystyrene, or polyvinyl chloride.

13. The process of claim 1 wherein the at least one salt of the fatty acid mixture is an alkali metal salt.

14. The process of claim 1 wherein the at least one salt of the fatty acid mixture is the ammonium salt.

15. The reaction mixture of claim 7 wherein the at least one salt of the fatty acid mixture is an alkali metal salt.

16. The reaction mixture of claim 7 wherein the at least one salt of the salt of the fatty acid mixture is the ammonium salt.

* * * * *